Figure 1:
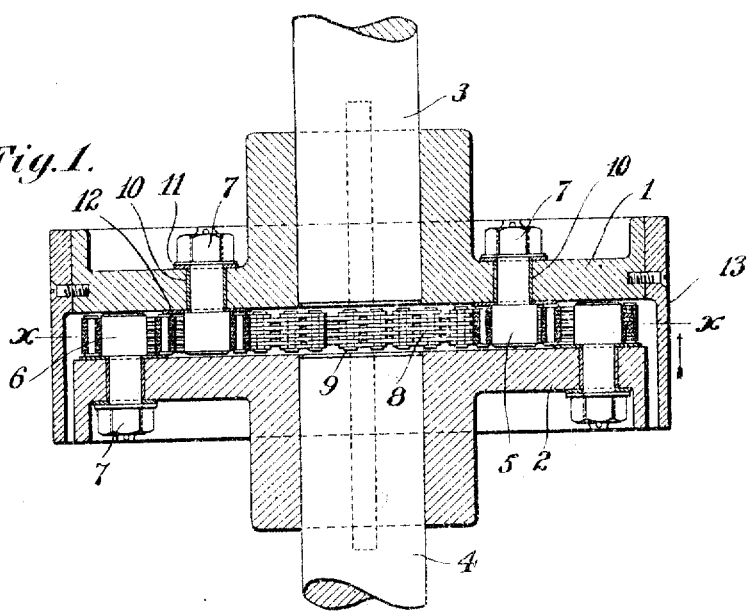

D. E. MAXFIELD.
FLEXIBLE COUPLING.
APPLICATION FILED JUNE 25, 1906.

953,700.

Patented Apr. 5, 1910.

Witnesses:

Inventor:
Daniel E. Maxfield
by his Attorneys
Att'ys

UNITED STATES PATENT OFFICE.

DANIEL E. MAXFIELD, OF DORCHESTER, MASSACHUSETTS, ASSIGNOR TO B. F. STURTEVANT COMPANY, OF BOSTON, MASSACHUSETTS, A CORPORATION OF MASSACHUSETTS.

FLEXIBLE COUPLING.

953,700.

Specification of Letters Patent.

Patented Apr. 5, 1910.

Application filed June 25, 1906. Serial No. 323,22.

*To all whom it may concern:*

Be it known that I, DANIEL E. MAXFIELD, a citizen of the United States, residing at Dorchester, in the county of Suffolk and State of Massachusetts, have invented certain new and useful Improvements in Flexible Couplings; and I do hereby declare the following to be a full, clear, and exact description of the invention, such as will enable others skilled in the art to which it appertains to make and use the same.

The present invention relates to improvements in flexible couplings.

In connecting dynamos and electric motors with steam engines or other machinery it is customary to use flexible couplings, to compensate for faulty alinement in the shafts of the machines, due to defective workmanship, or to wear upon the journals, and such couplings are also frequently utilized as insulating devices to prevent the escape of electricity from the dynamo or motor.

The present invention relates particularly to couplings for such purposes of the familiar type in which two disks, secured to the adjacent ends of the shafts to be coupled, and carrying two annular series of pins, are connected by a flexible band or connector interwoven about the pins, such band affording the necessary flexibility to the coupling and being also utilized as the insulating medium.

The object of the invention is to effect certain improvements in couplings of this character, particularly in respect to the form of flexible connector used and the manner in which the parts of the coupling are insulated from one another, and the invention consists in the improved flexible coupling hereinafter described and shown in the drawings, as defined in the claims.

Figure 2:
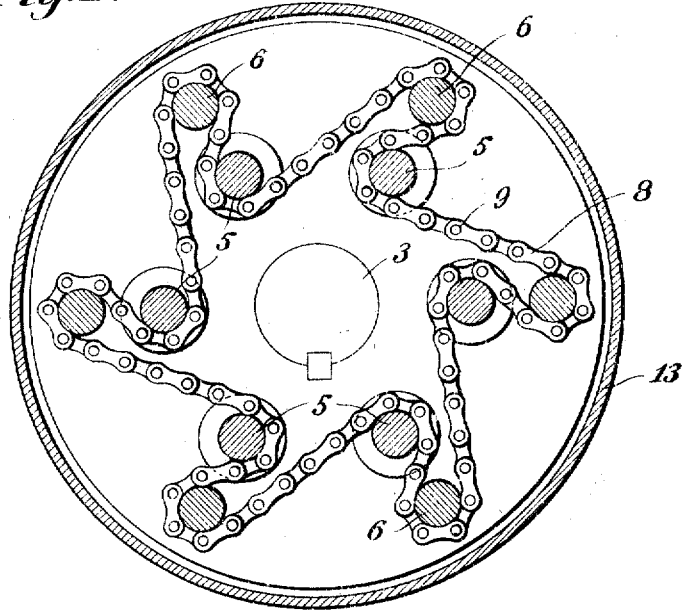

In the drawings Figure 1 is a horizontal section of a flexible coupling embodying the present invention, and Fig. 2 is a vertical section thereof on the line *x—x*, with the connector shown in full.

The illustrated embodiment of the invention comprises two disk-shaped coupling members 1 and 2 keyed to the ends of the shafts 3 and 4 which are to be coupled. Each disk carries an annular series of pins projecting toward the other disk, the pins 5 in the disk 1 being located within the pins 6 on the disk 2. These pins are provided with shoulders and with screw-threaded shanks engaged by nuts 7 as shown in Fig. 1, by which they are securely fixed in the disks.

The novelty of the present invention resides particularly in the flexible connector by which the coupling members are connected. This consists of a jointed metallic welt or chain 8, consisting of flat links pivoted together at their ends upon rivets 9 a construction which permits the connector to bend readily about the pins 5 and 6 and also to yield freely to any lateral displacement due to an angular disposition of the two shafts. The connector 8 is free from any projecting coupling or device of any character which would prevent its free longitudinal movement about the pins, so that it may yield freely to equalize the tension throughout its length, as is necessary where the ends of the shafts are laterally displaced. This action is further facilitated by the concave form of the edges of the link plates, which enables them to bear evenly upon the surfaces of the pins, which have the same radius of curvature as the surfaces of the links, as shown in Fig. 2. Owing to this arrangement the wear upon the parts due to the constant movement of the connector upon the pins is minimized.

In order to insulate the parts of the coupling from each other the pins 5 and 6 are set in insulated bushings 10, and provided with insulating washers 11 under the nuts and with insulating washers 12 under the shoulders of the pins, the latter washers extending also sufficiently over the inner surfaces of the coupling members to prevent the connector 8 from coming in contact with these members.

The coupling member 1 carries a cylindrical guard 13 removably fixed thereto which extends over the space between the coupling members. This guard serves to exclude dust or other foreign substance from the coupling and also prevents the escape by centrifugal action, of lubricant applied to the connector 8 to facilitate its compensating movements.

By the substitution of a flexible endless metal connector for the connectors of rope or leather beltings which have been previously used in devices of this character the coupling is rendered more compact and solid, since a connector of great strength may be contained in a much narrower space than a hemp or leather connector of equal strength, and for the same reason the pins can be made much shorter and less liable to breakage. The operation of the coupling is facilitated also, owing to the fact that the connector may be lubricated and may therefore move constantly in compensating for faulty alinement in the shafts without substantial resistance or wear on the parts. Where the connector is made of rope or belting, couplings or splices of some sort in the connector are necessary, and these interfere with the movement of the connector over the pins, whereas in the present invention there is nothing to interfere with the movement of the connector.

The insulation of the pins and the connector from the coupling members in the manner above described is of particular utility in connection with a flexible metallic connector, and is novel so far as the applicant is informed.

The invention is not limited to the details of construction of the illustrated embodiment, but may be embodied in other forms within the scope of the following claims:—

1. A flexible coupling having, in combination, two members fixed to the shafts to be coupled, a series of pins mounted on but insulated from one of said members, a series of pins in the other member, and an endless jointed metallic connector interwoven with the two series of pins and freely movable longitudinally about the pins, substantially as described.

2. A flexible coupling having, in combination, two members fixed to the shafts to be coupled, a series of pins in each of said members, an endless jointed metallic connector interwoven about the pins of the two series and freely movable about the pins, and insulating washers at the bases of the pins to prevent contact between the connector and said members, substantially as described.

In testimony whereof I affix my signature, in presence of two witnesses.

DANIEL E. MAXFIELD.

Witnesses:
 HORACE VAN EVEREN,
 FRED. O. FISH.